US011493933B2

(12) United States Patent
Lee et al.

(10) Patent No.: US 11,493,933 B2
(45) Date of Patent: Nov. 8, 2022

(54) METHOD FOR TRAVELING ON BASIS OF CHARACTERISTICS OF TRAVELING SURFACE, AND ROBOT FOR IMPLEMENTING SAME

(71) Applicant: LG ELECTRONICS INC., Seoul (KR)

(72) Inventors: Changhyeon Lee, Seoul (KR); Byungkon Sohn, Seoul (KR); Kyung Man Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 16/625,148

(22) PCT Filed: May 31, 2018

(86) PCT No.: PCT/KR2018/006252
§ 371 (c)(1),
(2) Date: Dec. 20, 2019

(87) PCT Pub. No.: WO2019/004618
PCT Pub. Date: Jan. 3, 2019

(65) Prior Publication Data
US 2021/0365041 A1 Nov. 25, 2021

(30) Foreign Application Priority Data
Jun. 27, 2017 (KR) .................. 10-2017-0081466

(51) Int. Cl.
*G05D 1/02* (2020.01)
*B60W 60/00* (2020.01)

(52) U.S. Cl.
CPC ......... *G05D 1/0274* (2013.01); *B60W 60/001* (2020.02); *G05D 1/0214* (2013.01);
(Continued)

(58) Field of Classification Search
CPC .. G05D 1/0274; G05D 1/0214; G05D 1/0217; B60W 60/001; B60W 2552/40;
(Continued)

(56) References Cited

U.S. PATENT DOCUMENTS 10,624,517 B2 * 4/2020 Jung .................. A47L 11/4066
2006/0076035 A1 * 4/2006 McGee .................. A47L 11/33
15/52.1
(Continued)

FOREIGN PATENT DOCUMENTS

KR  10-2007-0115245  12/2007
KR     10-0962593    6/2010
(Continued)

OTHER PUBLICATIONS

English Translation of KR 10 20170033579.*
(Continued)

*Primary Examiner* — Rami Khatib
*Assistant Examiner* — Shahira Baajour
(74) *Attorney, Agent, or Firm* — Ked & Associates, LLP

(57) ABSTRACT

The present disclosure relates to a method for driving on the basis of characteristics of a driving surface, and a robot for implementing the same, and a method for driving on the basis of characteristics of a driving surface, according to one embodiment of the present disclosure, comprises the steps in which: a sensing module of the robot senses an adjacent driving surface to generate characteristic information of the driving surface, and a control unit of the robot stores position and characteristic information of the driving surface in a map storage of the robot; the controller of the robot sets a function to be applied to the driving surface in response to the characteristic information of the driving surface, or generates a movement path selectively including the driving surface corresponding to start and end points of the robot;
(Continued)

and the controller controls a moving unit and a functional unit of the robot according to the set function or the movement path.

13 Claims, 12 Drawing Sheets

(52) U.S. Cl.
CPC ....... *G05D 1/0217* (2013.01); *B60W 2420/42* (2013.01); *B60W 2510/244* (2013.01); *B60W 2520/26* (2013.01); *B60W 2552/35* (2020.02); *B60W 2552/40* (2020.02); *B60W 2720/10* (2013.01); *B60W 2720/12* (2013.01); *G05D 2201/0203* (2013.01)

(58) Field of Classification Search
CPC ......... B60W 2552/35; B60W 2420/42; B60W 2510/244; B60W 2520/26; B60W 2720/10; B60W 2720/12
See application file for complete search history.

(56) References Cited

U.S. PATENT DOCUMENTS

| | | |
|---|---|---|
| 2007/0282484 A1 | 12/2007 | Chung et al. |
| 2013/0206177 A1 | 8/2013 | Burlutskiy |
| 2013/0274924 A1 | 10/2013 | Chung et al. |
| 2015/0202772 A1 | 7/2015 | Kim |
| 2018/0255997 A1 | 9/2018 | So et al. |

FOREIGN PATENT DOCUMENTS

| | | |
|---|---|---|
| KR | 10-2012-0059427 | 6/2012 |
| KR | 10-2013-0091879 | 8/2013 |
| KR | 10-2017-0033579 | 3/2017 |
| WO | WO-2018202367 A1 * | 11/2018 |

OTHER PUBLICATIONS

International Search Report dated Sep. 4, 2018 issued in Application No. PCT/KR2018/006252.
Korean Office Action dated Aug. 17, 2021 issued in Application No. 10-2017-0081466.

* cited by examiner

FIG. 3
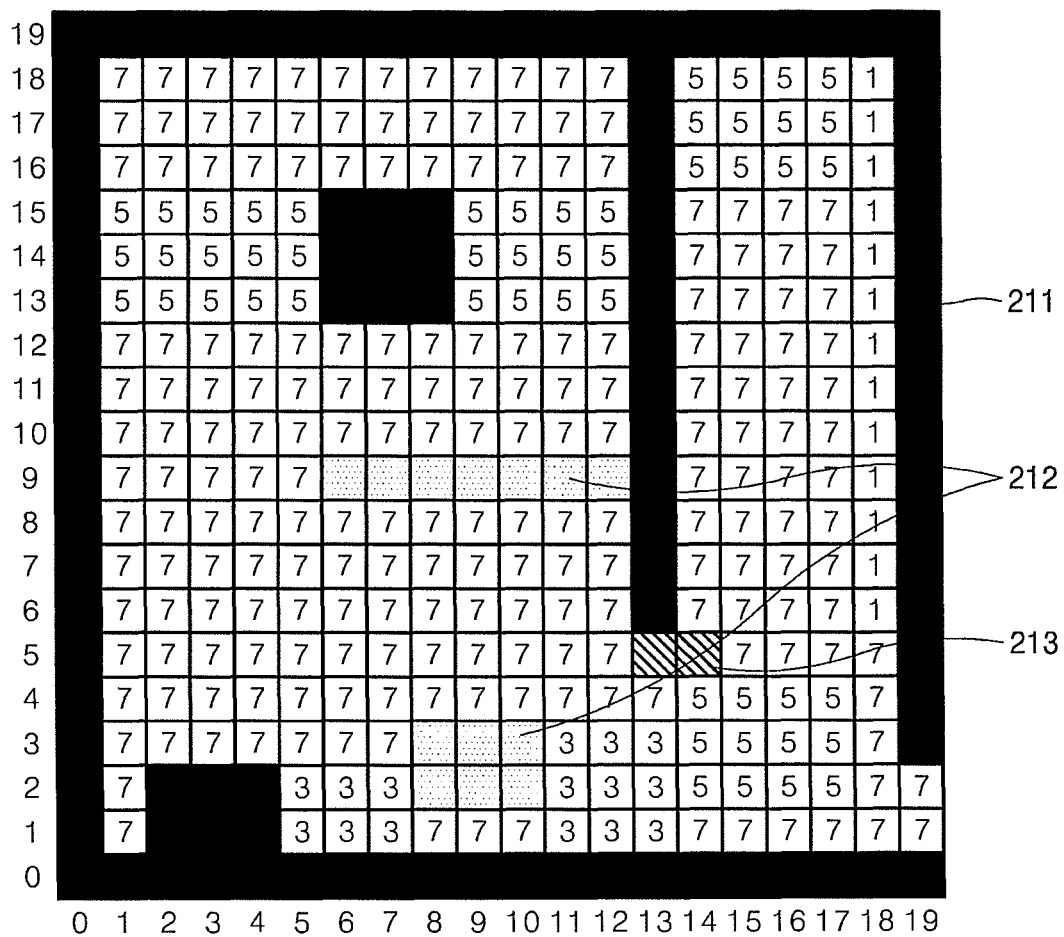
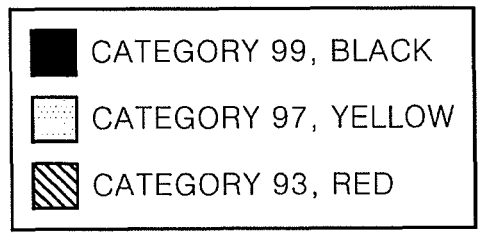

FIG. 4

| | PROPERTY INFORMATION |
|---|---|
| FIXED OBJECT | 91~99 |
| GROUND | 1~20 |

201a

| | PROPERTY INFORMATION |
|---|---|
| FIXED OBJECT MADE OF CONCRETE | 99 |
| FIXED OBJECT MADE OF GLASS | 97 |
| FIXED OBJECT MADE OF METAL | 95 |
| FIXED OBJECT MADE OF PLASTIC | 93 |
| UNCLASSFIED FIXED OBJECT | 91 |
| Reserved | 21~90 |
| GROUND MADE OF MARBLE | 7 |
| GROUND MADE OF GLASS | 5 |
| GROUND COVERED WITH CARPET-GRAY | 3 |
| GROUND COVERED WITH CARPET-RED | 1 |

201b

| PROPERTY INFORMATION | FUNCTION INFORMATION |
|---|---|
| 7 | Anti_Slip |
| 5 | Anti_Shock |
| 3 | Suction_Power1 |
| 1 | Suction_Power2 |

| Serial | CATEGORY | AREA INFORMATION |
|---|---|---|
| 001 | 5 | (1, 13) , (5, 15) |
| 002 | 5 | (9, 13) , (12, 15) |
| 003 | 5 | (14, 16) , (17, 18) |
| 004 | 5 | (14, 2) , (17, 4) |
| 005 | 3 | (5, 1) , ( 7, 2) |
| 006 | 3 | (11, 1) , (13, 3) |
| 007 | 1 | (18, 6), ( 18, 18) |

230a

FIG. 8
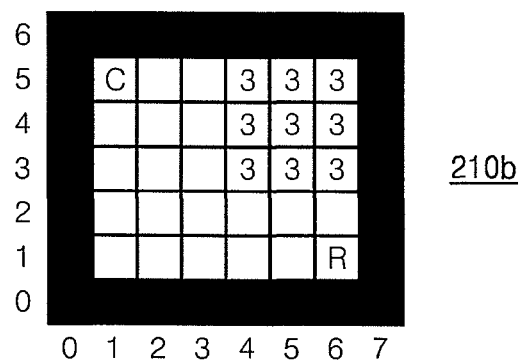
210b
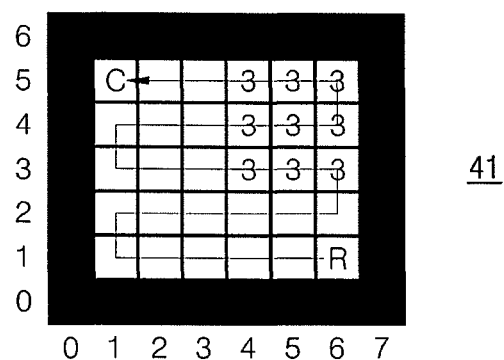
41
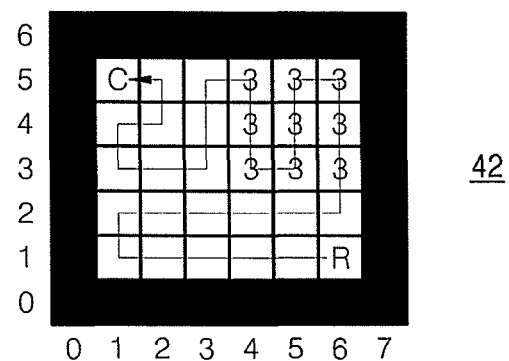
42

FIG. 13

| | PROPERTY INFORMATION | |
|---|---|---|
| | CATEGORY | RGB |
| GROUND MADE OF MARBLE | 7 | #E2CFCF |
| GROUND MADE OF GLASS | 5 | #E2CFCF |
| GROUND MADE OF CARPET | 3 | #696D74 |
| GROUND MADE OF CARPET | 1 | #F70B0B |

201e

METHOD FOR TRAVELING ON BASIS OF CHARACTERISTICS OF TRAVELING SURFACE, AND ROBOT FOR IMPLEMENTING SAME

CROSS-REFERENCE TO RELATED PATENT APPLICATIONS

This application is a U.S. National Stage Application under 35 U.S.C. § 371 of PCT Application No. PCT/KR2018/006252, filed May 31, 2018, which claims priority to Korean Patent Application No. 10-2017-0081466, filed Jun. 27, 2017, whose entire disclosures are hereby incorporated by reference.

TECHNICAL FIELD

The present disclosure relates to a method for driving a robot based on properties of a driving surface and a robot implementing such method.

BACKGROUND ART

Robots may be required for continually sensing spaces and moving in spaces so that robots operate in spaces where personal exchange and material resources exchange are actively performed, for example, cultural facilities such as airports, schools, government offices, hotels, offices, factories, gymnasiums, and concert halls. In this process, robots may store, in a map, information on objects placed in the spaces or structures of spaces.

Meanwhile, the robot may set a moving path based on various pieces of information sensed during moving of the robot, and various types of properties of the floor where the robot moves, that is, a driving surface may affect a mechanism for driving the robot. For example, the robot may operate or move differently depending on whether the driving surface is made of marble or is covered with carpet.

In particular, in the space where the personal exchange and material resources exchange are actively performed, the floor in the space may be made of various types of materials and various types of objects are frequently placed on the floor in the space. Thus, the robot may not efficiently operate, when moving devices of robots may not detect various types of changes that occur on the ground where the robot travels, along a particular driving surface. Therefore, in order to solve such a problem, the present disclosure provides a method for driving the robot based on properties of the driving surface.

DISCLOSURE

Technical Problem

To solve the above-described problems, the present disclosure provides a method of reducing battery consumption of a robot by adjusting, by a robot, a path based on driving surface.

The present disclosure also provides a method of reducing battery consumption of the robot by adjusting a function of the robot based on properties of the driving surface.

The present disclosure further provides a method of storing information to efficiently operate the robot based on properties of the driving surface, so that the robot operates based on the information to efficiently operate the robot based on properties of the driving surface.

The objects of the present disclosure are not limited to the above-mentioned objects, and other objects and advantages of the present disclosure which are not mentioned above may be understood by the following description, and will be more clearly understood by the embodiments of the present disclosure. It will also be readily apparent that the objects and advantages of the present disclosure may be implemented by features described in claims and a combination thereof.

Technical Solution

According to an embodiment of the present disclosure, a method for driving a robot based on properties of a driving surface, the method including: sensing, by a sensing module of the robot, the driving surface adjacent to the robot and generating property information related to the driving surface, storing, by a controller of the robot, position and property information related to the driving surface in a map storage of the robot; setting, by the controller, a function performed with respect to the driving surface based on the property information related to the driving surface or generating a moving path selectively including the driving surface in a section from a starting point to an ending point of the robot; and controlling, by the controller, a driving unit and a functional portion of the robot, to perform the set function or to move the robot along the moving path.

According to another embodiment of the present disclosure, a robot moving based on properties of a driving surface may include a map storage that stores a position of a fixed object placed in a space where the robot moves and property information related to a driving surface; a functional portion that performs a preset function; a driving unit that moves the robot; a sensing module that senses the driving surface adjacent to the robot to sense property information related to the driving surface; and a controller that sets the function performed with respect to the driving surface based on the property information related to the driving surface or generates a moving path selectively comprising the driving surface in a section from a starting point and an ending point of the robot, and controls the driving unit and the functional portion of the robot to perform the set function or to move the robot along the moving path.

Advantageous Effects

By embodiments of the present disclosure being applied, types and color of a floor surface on which a robot travels may be determined by a depth sensor, a vision sensor, and a light amount sensor.

Further, by embodiments of the present disclosure being applied, operation of the robot may be controlled based on types and color of the driving surface, so that the robot efficiently operates.

The effects of the present disclosure are not limited to the above effects, and those skilled in the art may easily understand various effects of the present disclosure based on configurations of the present disclosure.

DESCRIPTION OF DRAWINGS

FIG. 3 shows an exemplary configuration of a fixed map according to an embodiment of the present disclosure.

FIG. 4 shows property information, of information stored in a fixed map and a category corresponding to properties according to an embodiment of the present disclosure.

FIG. 5 shows an exemplary configuration of a list according to an embodiment of the present disclosure.

FIG. 8 shows an exemplary robot setting a moving path and a function of a functional portion based on properties of a driving surface in a moving space according to an embodiment of the present disclosure.

FIG. 13 shows an example combination of color information, in a map storage according to another embodiment of the present disclosure.

DETAILED DESCRIPTIONS

Figure 1:
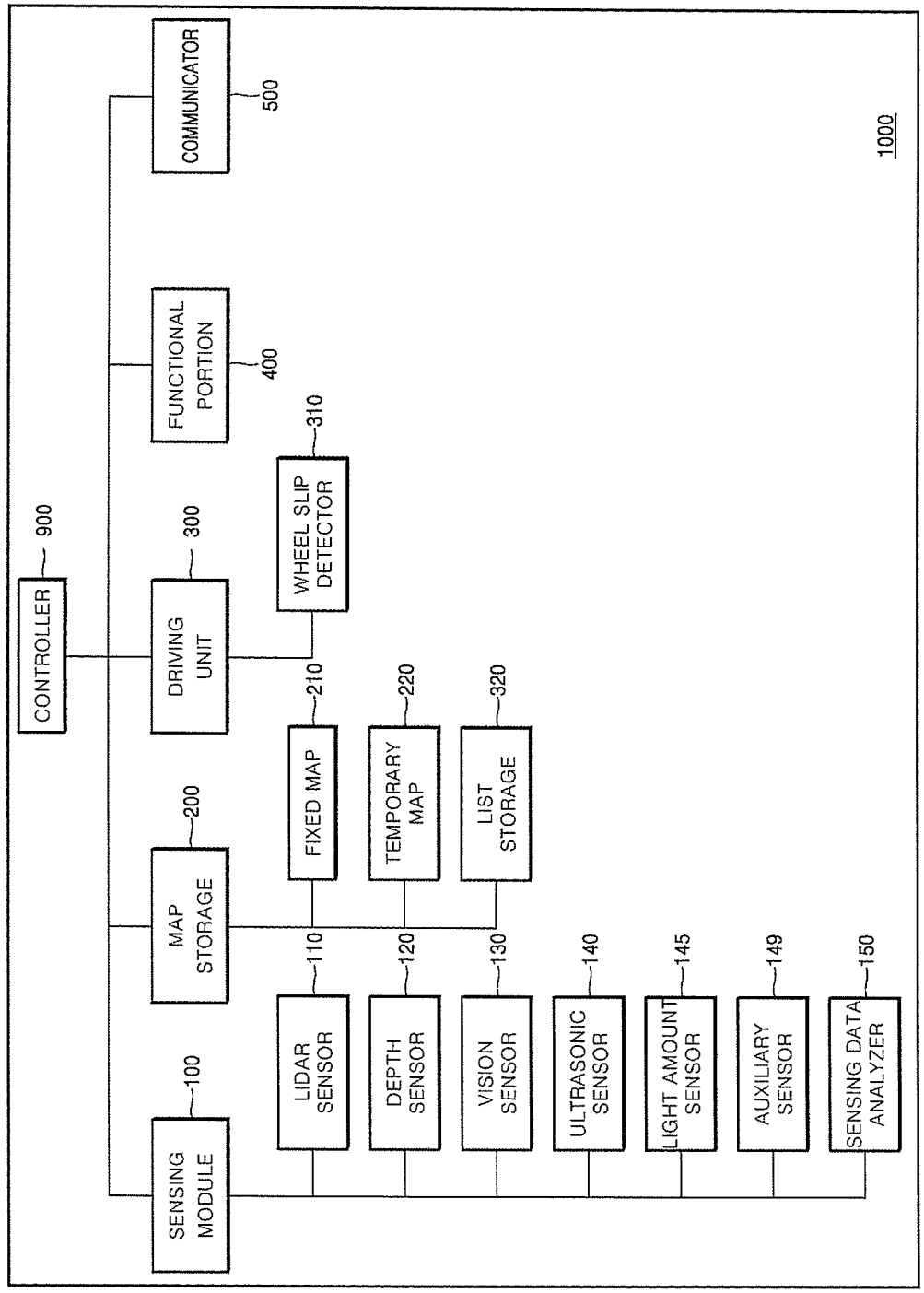
FIG. 1 shows an exemplary configuration of a robot according to an embodiment of the present disclosure.

Hereinafter, embodiments of the present disclosure will be described in detail with reference to the drawings so that those skilled in the art to which the present disclosure pertains may easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the present disclosure. Further, some embodiments of the present disclosure will be described in detail with reference to the exemplary drawings. In adding reference numerals to components of each drawing, the same components may have the same reference numeral as possible even when they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components are not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to implementation of the present disclosure, the present disclosure may be described by subdividing an individual component, for convenience of explanation, the components of the present disclosure may be implemented within an apparatus or a module, or a component of the present disclosure may be implemented by being divided into a plurality of apparatuses or modules.

In the following description, a robot includes a moving device having a particular purpose (cleaning, security, monitoring, guidance, and the like) or performing functions based on properties of a space where the robot moves. Therefore, in the following description, the robot may include the moving device that may move based on predetermined information and using a sensor and may perform a predetermined function.

Further, according to the present disclosure, the robot may control the function of the robot by sensing properties of the driving surface during moving of the robot in a particular space. For example, the robot performs a first function with respect to a first driving surface and performs a second function with respect to a second driving surface. The first function and the second function may be distinguished from each other based on properties related to the driving surface. The properties of the driving surface refer to a case in which physical components included in the driving surface affect moving the robot disposed on the driving surface or performing the function of the robot. As a result, the robot may control the robot to move or perform the function of the robot based on properties of the driving surface.

In the present disclosure, the robot may have a map and may move using the map. The map includes information on fixed objects such as fixed walls and stairs, which are determined not to move in the space. Further, information on dynamic objects which are disposed periodically is also stored in the map. In an embodiment, information on obstacles disposed within a predetermined range based on the robot's moving direction may be stored in the map. In this case, the information on obstacles may be registered on the map temporarily, unlike the map in which information on the above-mentioned fixed objects are stored, and subsequently, the information on obstacles may be removed from the map after the robot moves.

Further, the robot may store the information related to the driving surface, including information on a state of the floor (the ground) of the driving surface, with respect to an area in which the fixed objects are not disposed, for example, a space where additional obstacle is not disposed on the floor so that the robot may enter the space. For example, in one embodiment, the information related to the driving surface includes information on material of the floor. An exemplary embodiment of the information on the material of the floor may include a carpet of the floor or the marble, which are detected in real time by the depth sensor or the vision sensor. The obstacle disposed on the driving surface is determined, so that whether the robot may enter the driving surface may be determined.

In summary, the property information may include at least one of material information and color information related to the driving surface.

The information related to driving surface, for example, material of the floor, color of the floor, or types of the floor may be stored in the map of the robot. Alternatively, property information may be stored in the map, and the property information categorizes the properties based on the material of the floor or other properties that affect driving the robot or performing the function of the robot.

FIG. 1 shows an exemplary configuration of a robot according to an embodiment of the present disclosure. Although the configuration of the robot is hierarchically shown in FIG. 1, and components of the robot are logically provided, and physical components of the robot may be different from the logical components of the robot. One physical component may include a plurality of logical components, or a plurality of physical components may implement one logical component. Further, the hierarchy in FIG. 1 may not be required to be maintained.

A sensing module 100 senses external objects and provides a controller 900 with the sensed information. In one embodiment, the sensing module 100 may include a LiDAR sensor 110 that determines the material of external objects such as walls, glass, doors made of metal and calculates a distance between a current portion of the robot to the external objects based on intensity of a signal and a time at which the signal is reflected (a speed of the signal). Further, the sensing module 100 may further include the depth sensor 120 and the vision sensor 130 that generate the information on depth between the robot and the external object.

The depth sensor 120 may include a depth camera. The depth sensor 120 may determine a distance between the robot and the external object. In particular, the depth sensor 120, in association with the LiDAR sensor 110, may increase accuracy in sensing of the distance between the external object and the robot. The depth sensor 120 may generate the information on the depth with respect to the driving surface on which the robot moves in a travelling direction of the robot.

The vision sensor 130 may include a camera. The vision sensor 130 may photograph an image of objects provided around the robot. The robot may distinguish an image of a fixed object in which a lot of changes may not occur from an image of a moving object, to identify whether the external object is the moving object. Further, the vision sensor 130 senses the properties of the driving surface such as material of the floor and compares the property information related to the driving surface with the information on the driving surface, which was stored, by the controller 900, in the map.

Additionally, the sensing module 100 may include an ultrasonic sensor 140 that senses presence or absence of objects spaced apart from a robot 1000 within a predetermined distance. The ultrasonic sensor 140 provides information determined whether objects are present within a predetermined distance from the robot 1000.

Further, a light amount sensor 145 is disposed at a lower end of the robot to check the amount of light reflected from the floor to generate information on the properties of the driving surface, for example, material (aluminum, carpet, and the like).

Further, a plurality of auxiliary sensors 149 including a heat sensor may be disposed. These auxiliary sensors provide auxiliary sensing information required to generate a map or sense an external object. Further, these auxiliary sensors sense the properties of the driving surface when the robot travels and provide the property information related to the driving surface.

A sensing data analyzer 150 analyzes the information sensed by the plurality of sensors and transmits the information to a controller 900. For example, each of sensors may provide the information on the properties of the object and a distance between the robot and the object, based on detection, by the plurality of sensors, with respect to changes in properties of the driving surface. The sensing data analyzer 150 may combine the value corresponding to the property of the object with the value of the distance and generate property information and deliver it to the controller 900.

In particular, the information provided by the sensing module 100 including the sensing data analyzer 150 is provided to the controller 900 so that the controller 900 analyzes the driving surface on which the robot is disposed in the moving direction of the robot, to analyze whether the driving surface is a plane or an obstacle is disposed on the driving surface, or properties of the driving surface.

That is, the sensing module 100 may sense the driving surface adjacent to the robot to generate the property information related to the driving surface. The sensing module 100 may sense the obstacle provided around the robot. The adjacent driving surface may be variously set based on the moving speed and the sensing distance of the robot. In one embodiment, the driving surface is spaced apart from the robot by a sufficient distance such that the robot changes the moving path based on results sensed when the robot moves.

The map storage 200 stores information on objects disposed in a space where the robot moves. The map storage 200 includes a fixed map 210 that stores information on fixed objects which may not move or are fixed, among objects disposed in entire spaces where the robot moves. In fixed map 210, one object may be essentially disposed in the space. In the fixed map 210, the objects which may not move are only disposed in the space. When the robot moves in the space, more objects may be sensed than objects provided by the fixed map 210.

Position information related to the fixed objects may be essentially stored in the fixed map 210, and the fixed map 210 may further include properties of the fixed objects, for example, material information, color information, or other pieces of height information. Further, the fixed map 210 may also include information related to the driving surface of the space where the object may not be disposed. Changes in the fixed objects may be easily identified by the robot based on the additional information.

Further, the robot may generate a temporary map 220 indicates whether an obstacle is disposed within a predetermined range by sensing the surroundings during moving of the robot, and may move based on the temporary map 220. The temporary map 220 may be deleted, after the robot passed through the space, and may generate new temporary map 220. Further, the map storage 200 may include a list storage 230. Lists with respect to the area where the carpet is disposed or lists with respect to the area in which the wood floor is disposed may be additionally stored in the list storage 230, among the property information related to the driving surface, sensed by the sensing module 100 and determined by the controller 900, of the robot. Alternatively, lists with respect to the area where a nonslip pad is disposed may be additionally stored in the list storage 230. The robot may generate the moving path based on the information related to the area of the driving surfaces having the specific categories, stored in the list storage 230. In particular, the robot may suitably generate the moving path with respect to a particular driving surface on which the robot moves with a heavy consumption of batteries to perform the particular function or a driving surface on which the robot moves to perform a specific function.

In summary, the map storage 200 stores the information on positions of the fixed objects in the space where the robot moves and properties of the driving surface.

The driving unit 300 moves the robot 1000, such as wheels, and moves the robot 1000 under the control of the controller 900. In this case, the controller 900 may identify the current position of the robot 1000 based on information related to an area stored in the map storage 200 and may provide a driving unit 300 with a moving signal. The controller 900 may generate a path in real time based on various pieces of information stored in the map storage 200 or may generate the path during moving of the robot.

The driving unit 300 may include wheels and may further include a wheel slip detector 310 and the wheel slip detector 310 performs a function for detecting the wheel slip.

The functional portion 400 performs a specialized function of the robot, that is, a preset function. For example, the functional portion 400 of a cleaning robot includes components required for cleaning. The functional portion 400 of a guide robot includes components required for guidance. The functional portion 400 of a security robot includes components required for security.

The functional portion 400 may include various types of components to perform functions provided by the robot, but the present disclosure is not limited thereto. A communicator 500 transmits, to an external sever or other robots, the information acquired by the robot, or provides a function for receiving information from the above-described server or other robots.

The controller 900 of the robot 1000 may generate or update a map of the map storage 200. Further, the controller 900 identifies the information of the object provided by the sensing module 100, in particular, the properties of the driving surface during travelling of the robot, to control the travelling of the robot 1000 and a method of operating the functional portion 400 of the robot 1000.

Figure 2:
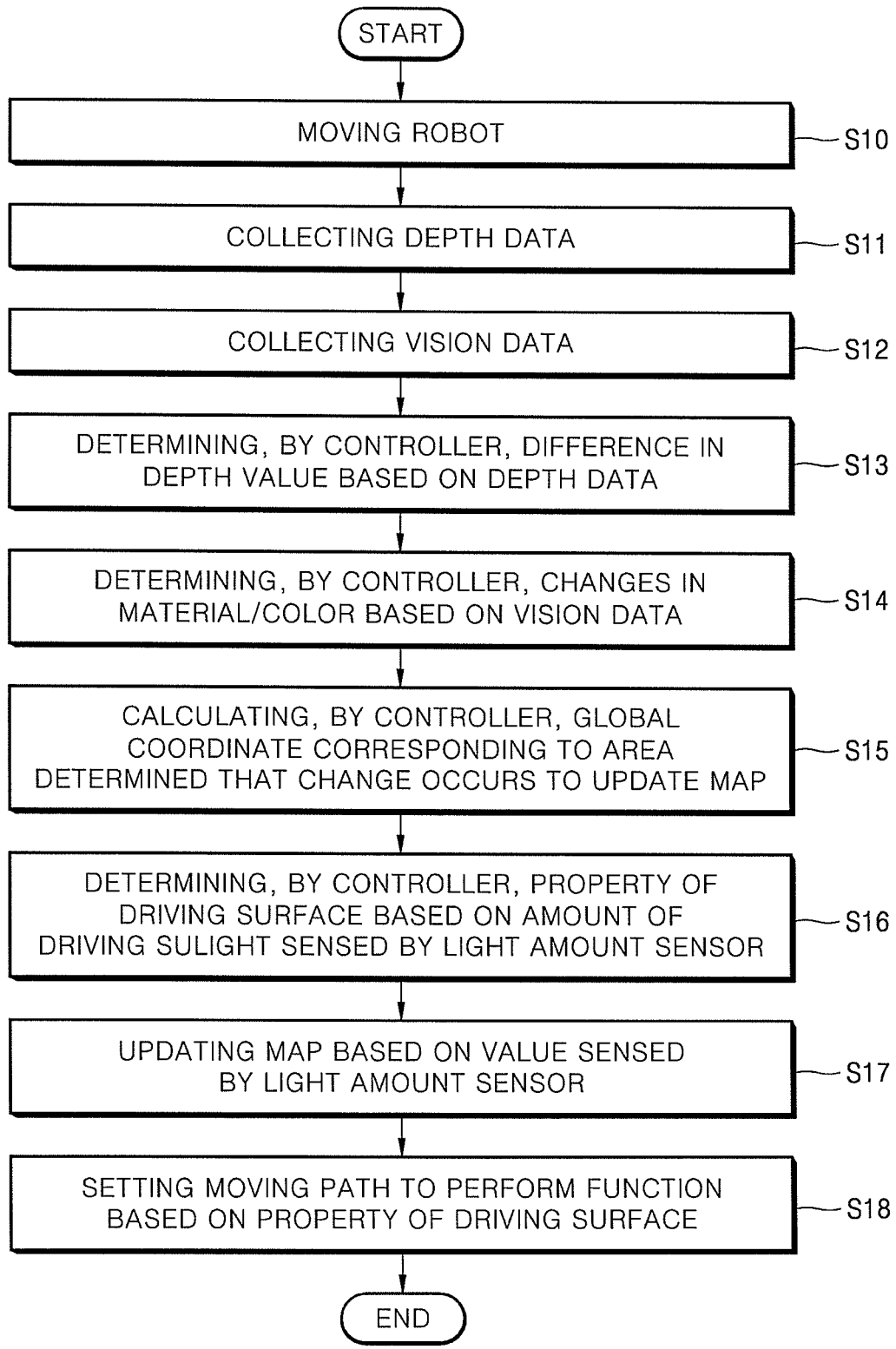
FIG. 2 shows an exemplary process of obtaining properties of a driving surface during moving of a robot according to an embodiment of the present disclosure.

FIG. 2 shows a process of obtaining, by a robot, properties of a driving surface during driving of the robot according to an embodiment of the present disclosure.

The robot collects depth data and vision data on the driving surface during travelling of the robot (S10) (S11 and S12). A depth sensor 120 and a vision sensor 130 may sense a depth value of something provided at a front side and a rear side, of the robot, or around the robot and an image of the robot to generate the depth data and the vision data. The controller 900 identifies whether a difference in depth values occurs based on the collected depth data (S13). The floor may be a flat surface if depth values are uniform. On the contrary, the controller 900 may determine that changes in frictional force of the floor occur or the carpet is placed on the floor based on non-uniform depth values or repeated increase and decrease of the depth values.

Further, the controller 900 identifies whether changes in the material, color, and the like, of the driving surface, occur based on the collected vision data (S14). The material or color of the driving surface may be determined based on a point corresponding to the vision data, having a specific boundary line and that is changed about the specific boundary line.

That is, in S13 and S14, the controller 900 may determine a frictional force of the floor based on the depth data and may identify the type of carpet. The depth data may be changed based on the type or a length of the carpet. Further, the controller 900 may determine the difference material of the driving surface based on the vision data, for example, different materials as carpets or marble. Further, the controller 900 may determine that the driving surfaces are made of the different materials based on the color corresponding to the vision data.

The controller 900 calculates global coordinates in an area determined that changes in properties of the driving surface occur based on changed situations collected in S13 and S14 to update the map (S15). The fixed object and the moving object may be displayed on the map. The property information related to the driving surface on which the object is not provided is stored. The properties of the driving surface may be updated during travelling of the robot or new property information related to the driving surface may be reflected.

Further, the light amount sensor 145 disposed at the lower end of the robot may measure an amount of light incident based on reflection of the light having a specific wavelength band from the driving surface of the area where the robot move, and the controller determines the properties of the driving surface based on the amount of light sensed by the light amount sensor 145. Further, the controller may update the map based on identification on the property of the driving surface different from the map, using the value sensed by the light amount sensor (S17).

The floor of a space is generally made of marble, where a large number of people move. An exemplary embodiment of updating the map is described below. The controller 900 may calculate global coordinates corresponding to points to determine an area made of materials (covered with carpet and made of wood) other than the marble, based on the sensed information. Material information related to the driving surface of each of areas may be stored in the map, with respect to the area made of different materials. Further, the map storage 200 may additionally generate the list of the area where the carpet is disposed or the list of the area in which the wood floor is disposed to store the lists in the list storage 230 of the map storage 200.

The controller 900 sets a moving path to perform a function based on the properties of the driving surface (S18). For example, when the robot 1000 is a cleaning robot and a cleaning mode of the cleaning robot may be frequently changed to a suction mode of the cleaning robot, the cleaning robot may clean a section in which the cleaning mode may be required to be changed last to induce battery saving. In particular, in a large area where the robot travels, various types of floors are mixed, unlike a household robot, so efficient use of battery is further required to respond to unexpected situations when the robot returns back to a docking zone, in case of battery shortage. Thus, the robot that moves in the large area may generate the properties of the driving surface and set the moving path of the robot based on the generated properties of the driving surface, so that the robot efficiently operates.

The controller 900 identifies the information stored in the map storage 200 and may classify an area where the properties of the driving surface are changed or the robot may perform a particular function and different areas, for example, the controller 900 may classify an area of a heavy consumption of battery and an area of small consumption of battery. The controller 900 of the robot may generate, based on classification, the moving path to perform the function of the robot in the area or based on a standard of battery consumption (S18). In one embodiment, the moving path may preferentially include the area with heavy consumption of battery, to generate the moving path. Alternatively, the area in which a large amount of battery is consumed to perform the function is preferentially included in the moving path.

Further, the robot may be controlled to completely move to a charging space, after the robot performs a function in which a large amount of batteries consumes, based on a distance between an area in which the robot may charge and a space in which a large amount of batteries consumes or a space in which the function thereof is required.

Further, the robot continually moves along the moving path to perform a function, and the controller determines an update state of the driving surface (S13). Performing operation to respond to the update of the driving surface is described above, for example, changing the moving path or changing the function based on newly updated property information, based on property information related to the driving surface sensed and the property of the driving surface updated based on the sensed information.

FIG. 3 shows a configuration of a fixed map according to an embodiment of the present disclosure.

A fixed map 210a may include a kind of bitmap. Each bit in the bitmap of an image file may indicate a single unit area. A lower left side of unit areas may be represented by (0, 0) and an upper right side of unit areas may be represented by (19, 19). Further, reference numeral 210a in FIG. 3 may have a data structure in a 20×20 matrix. For example, the map 210a may include information on whether an object is provided at each position. When information is provided as a kind of matrix and a fixed object is provided, a value corresponding to each matrix may be set to a predetermined value.

Further, the fixed map 210a may store property information related to the fixed objects, and the property information related to the objects may be classified into categories and stored in the fixed map 210a. In FIG. 3, a portion 211 indicated by a black color, in the fixed map 210a, represents an object made of a material such as a concrete which does not transmit light completely. The object made of the material such as a concrete which does not transmit light completely corresponds to category 99 and this configuration may be stored.

Meanwhile, a portion indicated as reference numeral 212 represents an object made of a material such as translucent glass which partially transmits light and partially reflects the light, which corresponds to category 97 and this configuration may be stored. Further, a portion indicated as reference numeral 213 represents an object made of a material such as glass having high light transmittance. Further, a portion indicated as 213 represents an object made of a material such as glass having high light transmittance, which corresponds to category 93, and this configuration may be stored.

That is, the fixed map 210a in FIG. 3 may store a category corresponding to properties of objects in each space in a 20×20 bitmap space, which may include a value (0) indicating an empty space in the 20×20 matrix or property information of a particular fixed object (e.g., categories 93, 97, 99, and the like). Materials, color, or fixing may be used for the property information related to the objects, and the property information may be used for a moving object.

The property information related to the objects varies depending on an implementation manner thereof, and the present disclosure is not limited to a particular number.

Meanwhile, the property information related to the driving surface may be input to the empty space where a fixed object is not placed. The information related to the driving surface includes information on color, material, or a function required to be performed with respect to the driving surface. The type of driving surface may be classified according to the above-mentioned factors. A kind of categorized information may be stored so that the information related to the driving surface is stored in the fixed map 210a and the information on these categories may be additionally provided.

FIG. 4 shows property information, of information stored in a fixed map and categories corresponding to the property information according to an embodiment of the present disclosure.

Reference numeral 201a shows a range of category corresponding to property information used for a fixed object and a range of category corresponding to property information used for a driving surface. Reference numeral 201b shows categories corresponding to property information, with respect to material property, determined based on an intensity in which a signal is reflected using a LiDAR sensor 110. In addition to the above configuration, properties of material or color may be used based on values sensed by other sensors.

Function information corresponding to each of driving surfaces may be generated as described in reference numeral 201c, after categories corresponding to property information are divided according to property of the fixed object and the property of the driving surface. For example, a slip-resistant (Anti_Slip) function may be set to be required for the ground made of marble (having the category corresponding to the property information of "7"). Further, a shock-prevention (Anti_Shock) function may be required with respect to the ground made of glass (having the category corresponding to the property information of 5).

When the slip-resistant function is set to be performed with respect to the ground made of marble (having the category corresponding to the property information of 7), the ground made of marble is likely to cause the wheel slip. Therefore, when the controller 900 determines the wheel slip of the driving unit 300 by controlling the wheel slip detector 310, the controller 900 may readjust the position thereof as follows. That is, the property information related to the driving surface disposed adjacent to the current position of the robot includes the wheel slip, the controller 900 may readjust the position of the robot based on the position of the driving surface stored in the map storage 200. For example, when the controller 900 calculates the position of the robot, that is, the controller 900 determines that the robot is placed at (5, 2), and the wheel slip occurs, which may not occur on the floor having the category of "3", the controller 900 of the robot may determine that the current position of the robot corresponds to (5, 3) rather than (5, 2) and may sense the surroundings to readjust the position of the robot.

Similarly, when the floor is covered with the carpet and the carpet has the gray color (having the category corresponding to property information of 3), and the robot is a cleaning robot, a function of a first stage of suction power (Suction_Power 1) may be set to be required. When the carpet has the red color (having the category corresponding to property information of 1) and the robot is the cleaning robot, a function of a second stage of suction power (Suction_Power 2) may be set to be required.

FIG. 5 shows a configuration of a list according to an embodiment of the present disclosure. A list 230a shows positions of driving surfaces corresponding to categories 1, 3, and 5. The serial number corresponds to information to identify a driving surface corresponding to one area. The category corresponding to property information related to the driving surface is provided. Area information is used to distinguish a position of one area from another position of another area and indicates a position of a lower left end of the map and a position of an upper right end of the map, in FIG. 3. In FIG. 5, the information on the category of "7" may not be included in the list 230a, which occupies most of the driving surfaces. The category of "7" corresponds to a kind of default value of the driving surface and the driving surface having the category of "7" may be distinguished from other driving surfaces without generating additional information.

As shown in FIGS. 2 to 5, the robot stores, in the map information provided by the robot, the property information such as material, types, and color of the floor, that is, the driving surface, and converts, into global coordinates, the property information related to the driving surfaces stored in the map, so that the property information related to the driving surface in a particular section may be stored in the list 230. The information on material, types, color related to the driving surface may be obtained by the depth sensor 120, the vision sensor 130, and a light amount sensor 140 provided at a lower end of the robot.

In one embodiment, the vision sensor 130 builds database including information such as carpets present in the airport, and the controller 900 compares the information input to the vision sensor 130 with the information stored in the database to determine the material of the floor. Further, deep learning may be performed to determine the material of the floor. For example, the robot 1000 may accumulate information input by the vision sensor 130 and compare the information with the values sensed by other sensors, to determine, by the controller 900, whether the floor is covered with the carpet or is made of glass or marble.

Meanwhile, values corresponding to the property information provided based on material and color of the floor detected by the depth sensor 120 are different, and thus, information related to the floor which is already present in the space where the robot operates and the information related to the floor which is provided and is removed flexibly may be input and the robot operates, so that the controller 900 may compare real-time data input by the depth sensor 120 with the types and the color of the driving surface and may determine the property information related to the driving surface.

Further, the light amount sensor 145 measures an amount of returned IR, which has been emitted, and the properties of the driving surface may be determined by the light amount sensor 145, in more detail. In one embodiment, the controller 900 may determine whether the floor is made of the material, such as aluminum having high reflectance of light, or the floor is covered with dark carpet, in which the light may not be easily reflected, based on values sensed by the light amount sensor 145. The amount of reflectance may vary depending on color even in the case of the same carpet, and thus, the color of the floor may be determined based on the measured values. Accordingly, the categories corresponding to the property information are stored differently even in case of the same carpet, which is described in FIG. 3.

FIGS. 2 to 5 show information related to driving surfaces sensed by various types of sensors stored in map storages 200. Further, the carpet rather than a fixed floor such as the marble may be disposed, or disposed and subsequently removed during travelling of the robot. Thus, the robot may generate a temporary map in which the information related to the floor of the surroundings, that is, the driving surface during moving of the robot in real time and may compare the temporary map with a map to update the map. The robot or a controller 900 of the robot may update and manage the map with respect to the driving surface the position of which is frequently changed, in particular a carpet, for example.

Figure 6:
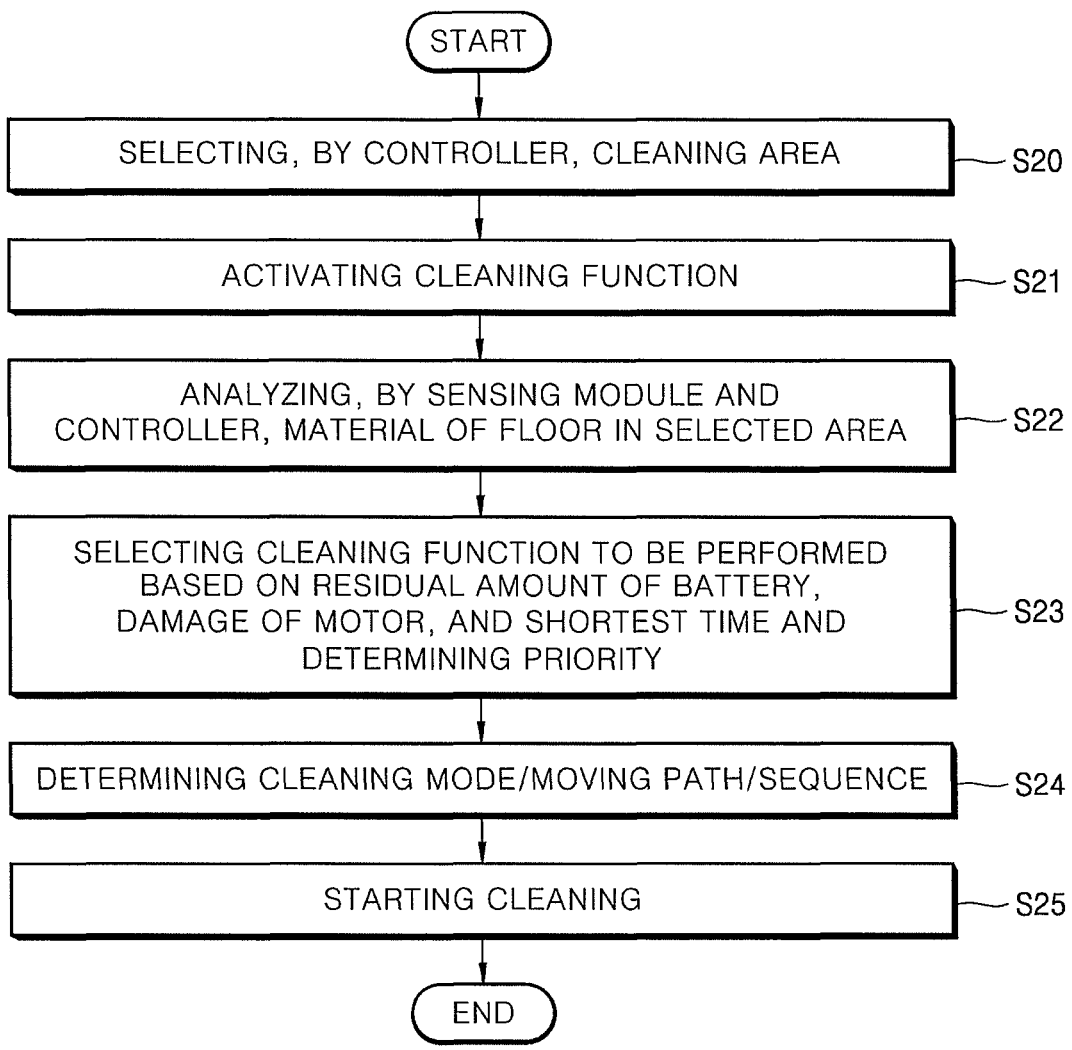
FIG. 6 shows an exemplary process of operating a cleaning robot according to an embodiment of the present disclosure.

FIG. 6 shows a process of operating a cleaning robot according to an embodiment of the present disclosure. A controller 900 selects a cleaning area (S20). One or more areas with different driving surfaces may be disposed in the cleaning area. Therefore, the controller 900 may first set a moving path in the cleaning area in advance.

Subsequently, a functional portion 400 activates a cleaning function (S21). Subsequently, a sensing module 100 and the controller 900 analyze the material of the floor, that is, the driving surface of the area designated to be cleaned (S22). During analysis, the controller 900 may first determine whether an obstacle is disposed with reference to a fixed map 210 and a temporary map 220 stored in map storage 200. Further, the controller 900 may identify the information on the material of the floor based on the property information of the list 230 and in FIG. 4. Meanwhile, the controller 900 may determine the material of the floor, that is, the property information related to the driving surface based on information sensed by the sensing module 100 in real time, that is, color of the driving surface and depth information.

The controller 900 may generate a possibility of motor's damage based on a residual amount of battery and property information related to material of the floor in the area, that is, the driving surface related to the driving surface and may select a cleaning function during a shortest period of time or may determine a priority for each section or each function (S23).

In view of determination in S23 in detail, it is determined that all allocated areas may be cleaned based on a current residual amount of battery. If possible, the path may be set to clean all areas. On the contrary, a path may be set to clean a portion of areas based on insufficient residual amount of battery. Alternatively, the controller 900 controls the functional portion 400 to operate the robot by omitting some functions, in an area corresponding to the property information related to the driving surface in which a large amount of battery consumes.

Further, when the functional portion 400 performs a cleaning function and provides a suction function or a brushing function using a particular motor, and the motor is excessively operated during performance of the suction or brushing function based on property information related to the driving surface, the operation of the motor may be adjusted. In one embodiment, the controller 900 may control the functional portion 400, for example, stopping performing the suction function or lowering a rotation speed of brushing, with respect to the driving surface in which the property information related to the driving surface is stored, for example, the driving surface is covered with the carpet or the driving surface has a concavo-convex shape. Of course, controlling a function may be performed to increase suction power or increase the rotation speed of the brushing, with respect to the carpet or the concavo-convex shape. In addition, when a plurality pieces of property information, not one piece of property information, related to the driving surface in the designated cleaning area are provided, a path along which the robot travels during a shortest period of time or a path along which the robot performs a function may be generated based on types of functions corresponding to property information related to the driving surface. In one example of S23, the function performed by the robot may be changed or adjusted based on the property information related to the driving surface. Alternatively, in one example of S23, a moving path of the robot may be newly generated, with respect to the driving surface corresponding to the property information to increase or decrease the speed of the robot.

Through determination in S23, the controller 900 determines a particular cleaning mode based on operation of the functional portion 400, determines the moving path and a cleaning order for areas (S24), and subsequently, a functional portion 400 starts cleaning (S25).

Processes in S22 to S25 may be repeatedly performed under the control of the controller 900 based on the property information related to the driving surface, when the robot starts cleaning, different from preset information or information stored in the map storage 200.

In view of the above-mentioned embodiments of the present disclosure, information on material, types, and the color of the floor of the driving surface is stored, as property information, in the fixed map 210 of the map storage 200 of the robot, thereby reducing battery consumption when the robot moves or performs the function of the robot and preventing the motor from being damaged to perform the function of the robot. That is, the robot may reflect the property information of the floor of the driving surface of the entire space and may set the moving path of the robot and types of functions such as cleaning and security, so that the robot may efficiently move. In addition, the robot may determine the material, types, the color of the driving surface, by the depth sensor 120, the vision sensor 130, or the light amount sensor 145 and may reconfigure the moving path and the function to be performed in real time based on the material, types, and the color of the driving surface different from the property information related to the driving surface stored in the map storage 200, to respond to situations in real time in which the driving surface is changed.

When a robot is first placed a specific space on a map, the robot may not have a map with respect to the entire space. In this case, the robot travels in the entire space to generate the map, and simultaneously senses the properties of the driving surface and stores the property information in the map storage 200.

Alternatively, a communicator 500 may receive, from another apparatus, a map with respect to a travelling space. In this process, the fixed object in the travelling space and the property information related to the driving surface may also be received.

Figure 7:
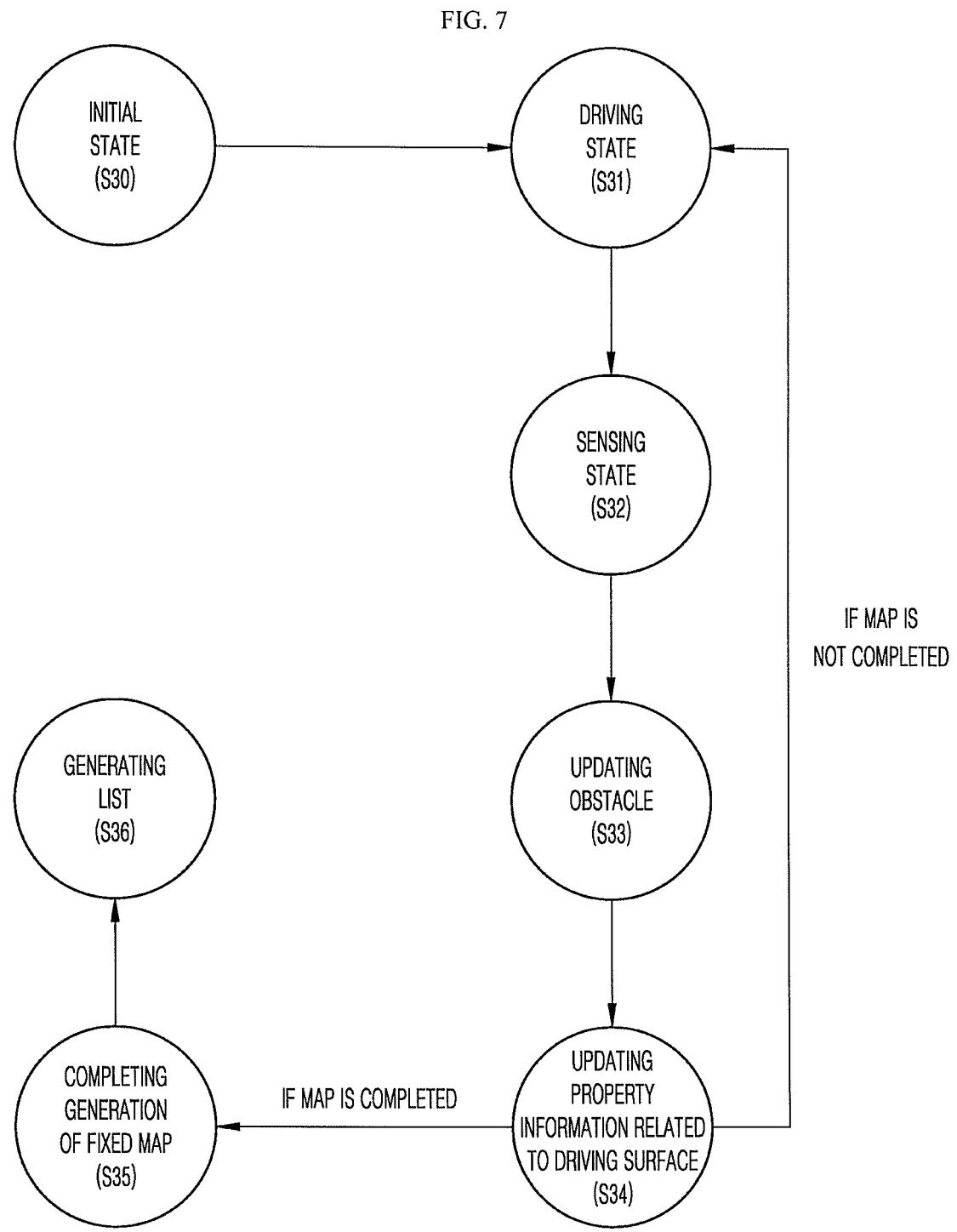
FIG. 7 shows a robot sensing property information related to a driving surface in space where the robot travels according to an embodiment of the present disclosure.

FIG. 7 shows a robot sensing property information related to a driving surface of a traveling space according to an embodiment of the present disclosure. Steps of FIG. 7 may be performed when additional map is not generated in map storage 200. FIG. 7 shows a process of sensing, by a sensing module of a robot, a driving surface adjacent to the robot and generating property information related to a driving surface, and storing the property information related to the driving surface in the map.

In an initial state (S30) in which no map is generated, the robot travels in space and senses an external object (an obstacle). In this process, the floor, that is, a driving surface is sensed.

In more detail, when the robot is changed from an initial state (S30) to a driving state (S31) and moves, the robot is in a state in which an object provided around the robot and a state of the floor are sensed (S32). In one embodiment, a LiDAR sensor 110 detects an external obstacle, and updates the position of the detected obstacle on the map (S33). Further, the depth sensor 120, the vision sensor 130, or the light amount sensor 145 sense the material, types, and color of the driving surface to update the property information related to the driving surface (S34).

That is, the sensing module 100 may sense the color of the driving surface to generate the property information in S34, and the controller 900 may store the color of the driving surface, as the property information, in the map storage. One set of material and color information may be stored, for example, carpet-green in FIG. 4 or the color information may be additionally stored. The above configuration is described with reference to FIG. 13.

When it is determined that the robot completes generating the map with respect to the entire space in states in S31 to S34, the generation of a fixed map is completed (S35). It may be determined that the generation of the fixed map is completed based on the robot returning to the same point as a starting point of the robot and based on the map generated by the robot similar to a schematic outline of a space where the robot will move or same as the schematic outline of the space where the robot will move within an error range. Otherwise, the robot continually senses the external object and the driving surface in the travelling state (S31) to update the property information related to the obstacle and the driving surface.

After S35 is performed, the controller 900 may generate the list 230 (S36). As shown in FIG. 5, common areas may be generated based on categories corresponding to the property information related to the driving surface. The area information corresponds to a standard to select the moving path and the function of the robot during travelling of the robot.

The processes in FIG. 7 are summarized. The sensing module of the robot may generate the property information related to the driving surface adjacent to the robot (e.g., within a predetermined range of distance such as 1 m or 2 m from the robot) during moving of the robot. The generated information may be stored in the map to indicate property information as shown in FIG. 3 at the positions of the driving surface, and the generated information is corresponds to the previously categorized property information or newly generated property information as shown in FIG. 4.

In particular, according to an embodiment of the present disclosure, a robot (e.g., a cleaning robot or a security robot, and a guide robot) that moves and performs a function in a large area such as airports may change a particular function mode of the robot (a cleaning mode, a guide mode, and a travelling mode) depending on types of materials of the floor to efficiently manage the battery consumption.

In the case of the depth sensor 120 used to detect the obstacle based on the types of the floor, a calibration coefficient may vary, so that information on types and color of the floor, which is sensed by the vision sensor 130 and the light amount sensor 145, may be stored in the entire map provided by the robot and the robot may generate the path based on the information and may selectively perform the function.

FIG. 8 shows a robot setting a moving path and a function of a functional portion based on properties of a driving surface of a driving space according to an embodiment of the present disclosure. In reference numeral 210b, R refers to a current position of the robot, C refers to a charging position of the robot, and "3" refers to a driving surface in which carpet-gray is disposed. In one embodiment, "Suction-_Power 1" is used for the carpet-gray to increase battery consumption, among functions of the functional portion. The controller 900 of the robot may reflect the positions of the driving surfaces (indicated by 3) in which the battery consumes and the position of a charging space to generate the moving path.

As described in reference numeral 41, the controller 900 may generate the path corresponding to a shortest distance without reflecting the property of the driving surface, when changing functions with respect to area indicated by "3" and areas not indicated by "3" does not affect the battery consumption or battery efficiency of the robot.

Meanwhile, when the battery consumption of the robot becomes large or the efficiency of the battery becomes low when functions are changed with respect to the areas indicated by "3" and the areas not indicated by "3", the moving path of the path may be generated so that the robot may complete the moving in the areas indicated by "3" without moving to other areas in consideration of properties of the driving surface. This configuration is shown in reference numeral 42.

Figure 9:
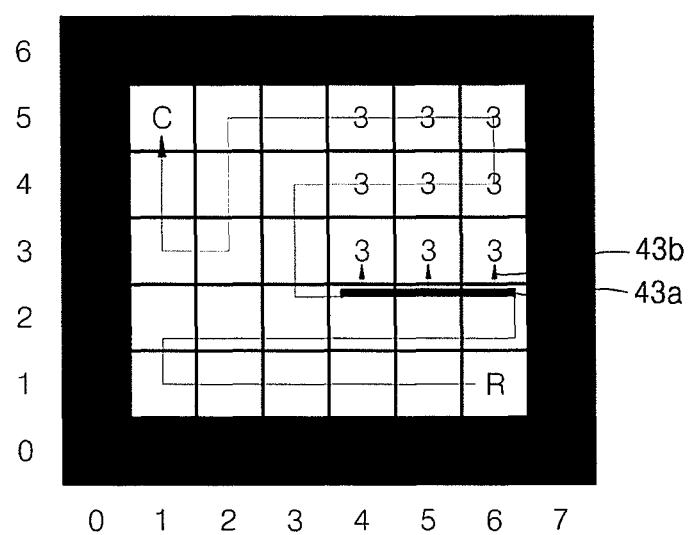
FIG. 9 shows an example of generating a moving path based on reference numeral 210b in FIG. 8.

FIG. 9 shows generating a moving path based on reference numeral 210b in FIG. 8. When the robot slowly moves in areas indicated by "3", the robot may generate a moving path having a minimum of distance in which the robot passes through areas indicated by "3". In one embodiment, when the robot may perform the function at an outer boundary area of areas indicated by "3", the robot may perform the function at the outer boundary area of areas indicated by "3", and subsequently, the robot may enter areas indicated by "3".

In view of a path in reference numeral 43 in FIG. 9, a section 43a may be provided in which the robot performs a function at the outer boundary of areas indicated by "3", without entering the areas indicated by "3". In section 43a, the robot may perform the function with respect to areas indicated by "3", for example, (4, 3) to (6, 3). For example, the cleaning robot may move along a path indicated by reference numeral 43a, and a functional portion 400 may be extended or protruded from the robot, and may perform brushing or suction as described with respect to areas indicated by "3", for example, (4, 3) to (6, 3), in reference numeral 43b. The reference numeral 43a refers to a path closest to areas indicated by "3", for example, (4, 3) to (6, 3).

As shown in FIG. 9, the controller 900 controls, based on the material of the driving surface reducing the moving speed of a driving unit, the functional portion 400 to operate the functional portion 400 at the outer boundary 43a adjacent to the driving surface. This may increase a moving speed, as well as maintaining an efficiency of performing the function. The material to reduce the moving speed of the driving unit may have a category corresponding to the property information.

FIGS. 8 and 9 are summarized as follows.

The controller 900 may set a function or set a moving path based on the property information related to the driving surface of the space where the robot moves. This process is described in detail as follows. First, the controller 900 searches for a function corresponding to the property information in the map storage 200, and the controller may control the functional portion to adjust the performance of the function with respect to the driving surface when the performance of the searched function consumes the battery of the robot with a predetermined standard or more. For example, in reference numeral 41 in FIG. 8, even when it is determined that the suction power may be increased in the areas corresponding to category of "3", the controller 900 may adjust the function not to increase the suction power even when the robot has the low battery. In particular, when a large amount of battery consumes with respect to the driving surface corresponding to a particular category during moving of the robot, while the robot has insufficient battery, as shown in FIG. 9, the controller move the robot along a path indicated by reference numeral 43a and may control the functional portion 400 and the driving unit 300 to perform the function in upper direction with respect to the driving surfaces having the category "3".

Further, yet another embodiment is described in detail as follows, in which the controller 900 sets the function or sets the moving path based on the property information related to the driving surface of the space where the robot moves.

The controller 900 may search for a function corresponding to the property information in the map storage 200, and may set, based on the battery of the robot consuming with a standard or more by performing the searched function, a moving path in consideration of the distance between the driving surface and the charging station (C) of the robot. In FIGS. 8 and 9, the driving surface having the category "3" is included in the moving path because the driving surface corresponding to the category "3" is close to the charging station (C). On the contrary, the controller 900 may exclude the driving surface having the category of "3" from the moving path when the driving surface having the category of "3" is far from the charging station (C) is not close.

In this process, the robot initially starts on a general driving surface made of marble, rather than the driving surfaces having the category of "3" corresponding to (4, 3) to (6, 5). Even when the moving path is determined as shown in reference numeral 41 in FIG. 8, and the property information related to the driving surface is newly updated based on a result of sensing during moving of the robot and the robot's battery is low, the robot may directly move to the charging station (C) and may charge the battery of the robot by excluding the driving surface sensed to have the category of "3", and subsequently, the robot may move to the driving surface sensed to have the category of "3".

Figure 10:
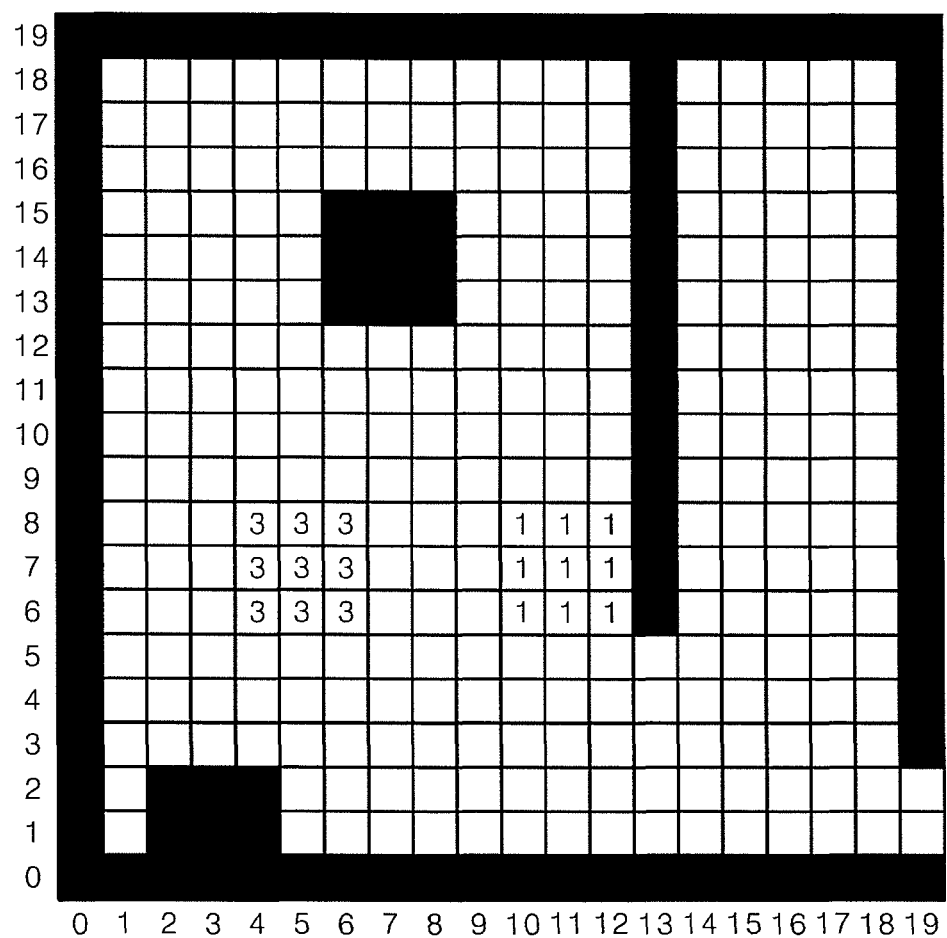
FIG. 10 shows an exemplary robot operating based on material and a distribution of a driving surface in a traveling space of the robot according to an embodiment of the present disclosure.

FIG. 10 shows an exemplary robot operating based on material and distribution of a driving surface in a travelling space according to an embodiment of the present disclosure. FIG. 10 mainly illustrates a cleaning robot, but the present disclosure is not limited thereto.

In FIG. 10, an area indicated by "3" in the fixed map 210e corresponds to a carpet having a first color, and an area indicated by "1" corresponds to a carpet having a second color, and the property information may be set in which amount of battery consumption of two types of carpet areas are different, when two types of carpet areas are cleaned. As an exemplary embodiment in FIG. 4, the suction power of "1" and "3" are different each other.

When the robot may not clean entire area at once based on the residual amount of battery measured in the current state, the controller 900 may determine whether to clean the carpet first or the floor made of marble, without the carpet, before the robot returns back to the charging station. Alternatively, the controller 900 may determine whether to clean the carpet area indicated by "3" or the carpet area indicated by "1", among the carpets, in consideration of magnitude of the suction pressure.

Alternatively, when information the floor made of the material that may damage the motor is input to the robot in advance, and the area stored in the depth sensor 120 or the fixed map 210e is determined to be the area where the motor may be damaged, the result of sensing or the information related to the area may be transmitted to the external server and a confirmation message with respect to performance of an additional cleaning function may be received to perform the cleaning.

Figure 11:
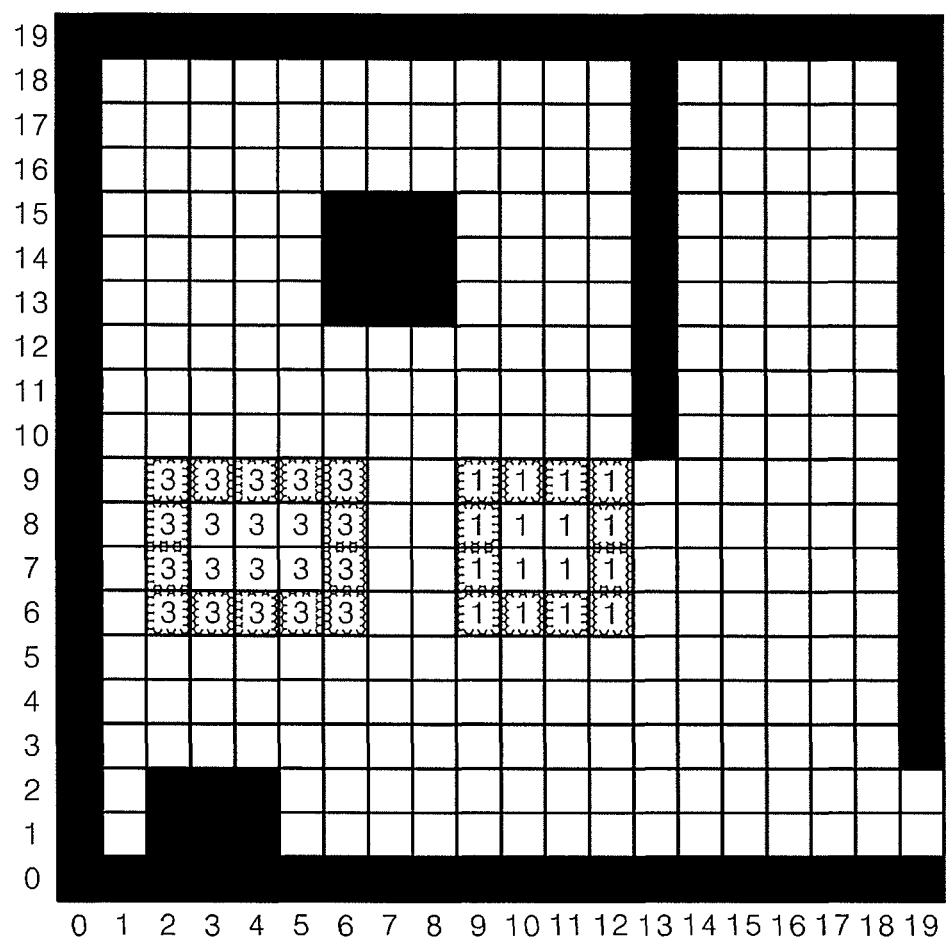
FIG. 11 shows a function performed with respect to a boundary area at which areas are divided based on a difference in property information according to an embodiment of the present disclosure.

FIG. 11 shows a function with respect to a boundary area through which areas are divided based on difference in property information according to an embodiment of the present disclosure. Different functions may be performed with respect to the area corresponding to property information of "3" and the area corresponding to the property information of "1" when the robot performs functions with respect to the carpet area corresponding to the property information of "3", the carpet area corresponding to the property information of "1", and other areas. However, the area corresponding to the boundary, such as the edge of the carpet area may be missing a function such as cleaning.

The boundary may not be accurately identical to the boundary of the map when the robot performs a function in a direction from an inside of the carpet area to an outside of the carpet area or performs a function in a direction from the outside of the carpet to the inside of the carpet, and thus, an area may be left without functioning, such as cleaning. Thus, the controller 900 of the robot may determine that the functions are all performed with respect to the boundary areas in which property information is changed, thereby preventing the area in which the function is not performed from being provided.

For example, when the cleaning robot cleans the carpet areas corresponding to property information of "3" by increasing the suction power, and cleans the area made of marble (not shown) by reducing the suction power, the cleaning robot may clean the carpet area by reducing the suction power due to error between the space stored in the map storage in the boundary area and the space where the robot travels.

Therefore, the robot may perform a function based on comparison of the map and the property information of the driving surface at the current position of the robot using values sensed by various types of sensors. For example, when the floor is determined to be made of marble in the map, but sensed values indicate that the floor is covered with the carpet, the robot determines the area as carpet and prevents the occurrence of unfunctioned (not cleaned) area.

In another embodiment, if the boundary of the marble area (not shown) is not matched with the boundary of the carpet area, the controller 900 may determine that the area in which the function is not performed and the robot may move to the boundary area, and subsequently, robot may reduce the moving speed and senses the driving surface to perform the function with respect to the area in which the function is not performed again.

When embodiments of the present disclosure are implemented, the robot may have information on types of the floor present in a large-sized space, where a large number of people move, such as airports, that is, a driving surface on which the robot travels, with position information related to the map or property information. Further, the controller 900 predicts the function performed by the robot based on types (corresponding to property information) of the driving surface and the battery consumption due to the performance of the function, the controller 900 selects the moving path and performing the function.

In one embodiment, in the case of the cleaning robot, the functional portion 400 may include a suction motor, a side brush motor, and a main brush motor. The battery used by each of motors or load applied to each of motors may vary based on the driving surfaces. Similarly, the driving unit 300 may also include a wheel motor to move. The control to increase or decrease speed may vary depending on properties of the driving surface, and battery consumption may vary depending on the above configuration, and the load applied to the motor may also vary depending on the driving surface. Thus, excessive load or battery consumption may be prevented in advance, thereby increasing a total lifespan of the robot.

In particular, the controller 900 may predict the wheel slip based on the material of the floor provided by the property information related to the driving surface. Errors in positions thereof may be changed based on the information on the material of the floor, when the robot shows abnormality in movement.

Figure 12:
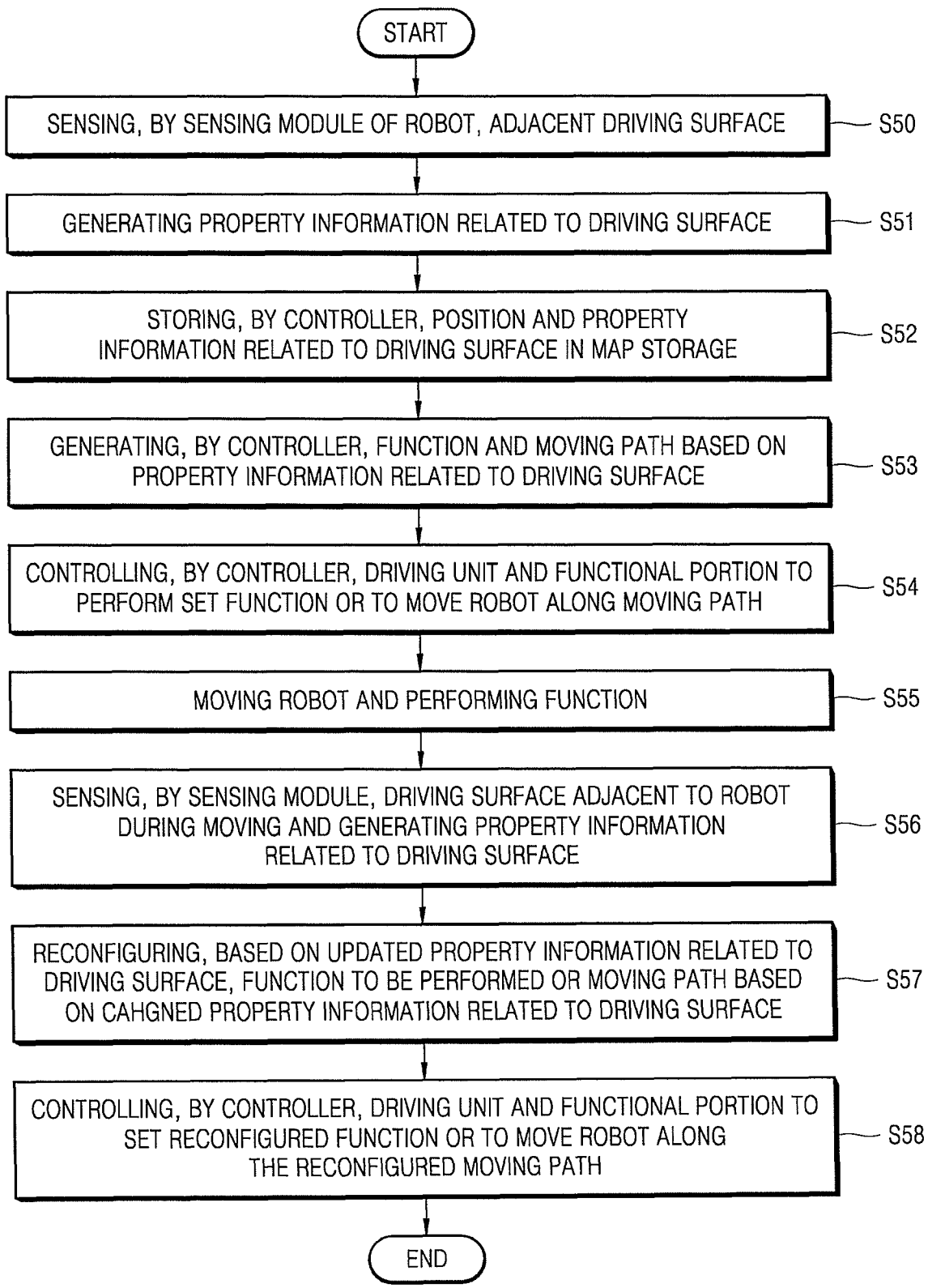
FIG. 12 shows an exemplary process in which a robot travels based on properties of a driving surface and performs a function according to an embodiment of the present disclosure.

FIG. 12 shows a process in which a robot travels and performs a function based on properties of a driving surface according to an embodiment of the present disclosure.

A sensing module 100 senses adjacent driving surfaces (S50) to generate property information related to the driving surfaces (S51). A controller 900 stores, in a map storage 200, position information and property information related to the driving surface (S52). The stored information may be shared, through the communicator, with other robots.

The controller 900 may set a function to be performed with respect to the driving surface based on the property information related to the driving surface (S53). Alternatively, the controller 900 may generate a moving path that selectively includes a driving surface including a starting point and an end point of the robot (S53).

In particular, in the case of a robot operating in a large area, it is important to function and move, as well as reducing battery consumption. Therefore, increase/decrease of speed of suction motor and rotating motor for main/side brush may be additionally set based on the material and types of the floor, that is, property information related to the driving surface. The controller 900 may calculates the battery consumption based on the set and the controller 900 may generate the efficient moving path. Further, the property information related to the driving surface, which corresponds to the information on material of the floors, may be included in the fixed map 210 of the map storage 200 provided by the robot, before the robot moves. So, increase or decrease the speed of the motor may be variably changed based on the current position of the robot, thereby reducing the battery consumption.

Further, when a large amount of battery consumes or the efficiency of the battery decrease when the functional portion 400 of the robot changes functions, the controller 900 may generate the moving path, so that the functional portion 400 performs all functions with respect to the driving surface corresponding to the same property information, and subsequently, the robot moves to other areas. In the driving surfaces having the same property information, it is not necessary for additional changes in function or changes of moving methods, thereby time consumption and battery consumption can be reduced. Subsequently, the controller controls the driving unit 300 and the functional portion 400 based on the set function or moving path (S54) and the robot moves along the moving path to perform the function (S55).

The sensing module 100 senses a driving surface adjacent to the robot during movement and generates property information related to the driving surface (S56), to respond to changes in property information related to the driving surface. In particular, installation is frequently disposed on or removed from the floor, such as the carpet, in spaces such as airports and terminals. So, when the robot moves based only on the map, error in properties of the driving surface may occur.

The controller 900 updates the map storage 200 based on comparison of the stored property information on the position of the driving surface of the map storage 200 with the generated property information related to the sensed driving surface, in S56. The controller 900 reconfigures, based on updated the property information related to the driving surface, a function or a moving path based on changed property information related to the driving surface (S57). As described above, in S53, the function and the moving path may be reconfigured. The residual amount of battery of the robot may be calculated and a movable range of the robot and an ending point where the robot arrives or a position of the charging station may be reflected to generate the moving path. The robot controls the driving unit 300 and the functional portion 400 to perform the reconfigured function or to move the robot along the moving path (S58).

FIG. 13 shows example color information included in map storage according to another embodiment of the present disclosure. In an embodiment, color information is combined with a portion of categories corresponding to property information. Additional values corresponding to color information (RGB) may be provided with respect to categories. In reference numeral 201e, information on colors of the ground sensed by a vision sensor 130 of a sensing module are stored in map storage and the color information related to the ground may be represented by RGB codes.

Subsequently, errors in color of the driving surface sensed during moving of the robot may occur based on external light. Accordingly, the controller 900 may reflect the difference caused by external light during comparison of the color information among the stored property information. FIG. 13 shows example category representing material information related to a driving surface and color information related to the driving surface independently stored in the map storage 201e, provided as examples of property information.

By the present disclosure being applied, the vision sensor, depth sensor, light amount sensor, and the like determine the material and color of the floor surface to store in the map storage 200 to change a method of moving the robot or a method of performing a function of the robot based on the material of the floor surface. Further to detecting obstacles using the depth sensor, various types of sensors may determine the material of the floor. Further, as the material of the floor in a particular area, that is, the driving surface may be determined on the map, the controller 900 of the robot may generate the path of the robot in advance based on the material of the driving surface. Further, the controller 900 of the robot may additionally set the path of the robot and the function which is performed with respect to the particular driving surface based on the driving surface, thereby reducing the load of the robot or the battery consumption. Thus, the efficiency of operation of the robot is increased when the operation of the robot may be controlled in advance, compared to a method of changing the moving path or the function of the robot after the robot feedbacks the load of the motor of the driving unit for the changes in the driving surface.

As illustrated in FIGS. 3 and 4, according to the embodiment of the present disclosure, the robot may set a particular function mode in consideration of the material of the floor based on the information of the map storage 200 and the list 230 of the robot. For example, when the robot 1000 is a cleaning robot, the cleaning mode may be changed depending on the material of the floor. Further, the sensing module 100 of the robot 1000 may sense, in real time, the floor information related to the driving surface sensed during moving of the robot and may update it based on the floor information related to the driving surface different from the property information related to the driving surface stored in the map, and may change the path and the function depending on the changed matters.

Further, the cleaning robot may generate the cleaning path based on an area of the floor having the particular property of the driving surface. In this process, a cleaning possible area may be set based on the residual amount of battery. In particular, as the battery consumption may be greater in case of the carpet, the controller 900 may generate the moving path and may perform the function of the robot based on the chargeable area and the residual amount of battery of the robot.

Although components included in the exemplary implementation of the present disclosure are described as being combined to one, or as being coupled to operate, such exemplary implementation is not necessarily limited to this particular example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program module that is transmitted in real time through an external apparatus.

While the present disclosure has been mainly described referring to the exemplary embodiments of the present disclosure hereinabove, various modifications and changes can be made at the level of those skilled in the art. Therefore, unless such a modification and change do not deviate from the range of the present disclosure, it will understand that they are included in the scope of the present disclosure.

[Description of Symbols]

| | |
|---|---|
| 100: Sensing module | 110: LiDAR sensor |
| 120: Depth sensor | 130: Vision sensor |
| 145: Light amount sensor | 200: Map storage |
| 210: Fixed map | 230: List storage |
| 300: Driving unit | 400: Functional portion |
| 500: Communicator | 900: Controller |
| 1000: Robot | |

The invention claimed is:

1. A method for driving a robot based on properties of a driving surface, the method comprising:
   sensing, by a sensing module of the robot, the driving surface and generating property information related to the driving surface;
   identifying, by a controller of the robot, a position of the robot based on information related to an area and stored in a storage of the robot;
   storing, by the controller of the robot, data identifying the position and the property information related to the driving surface in the storage of the robot;
   setting, by the controller, a function performed on the driving surface based on the property information related to the driving surface and generating a moving path by classifying an area of a heavy consumption of a battery and an area of a small consumption of the battery;
   controlling, by the controller, a driving unit and a functional portion of the robot, to perform the set function or to move the robot along the moving path; and controlling, by the controller, the functional portion to operate at an outer boundary of the driving surface when a material of the driving surface reduces a moving speed of the robot,
wherein the function includes a cleaning mode, a suction mode, or a brushing mode using a motor,
wherein the property information corresponds to at least one of material information or color information related to the driving surface, and
wherein setting the function and generating the moving path further includes:
generating, by the controller, a possibility of damage to the motor based on a residual amount of the battery and the property information related to the material of the driving surface in the area; and
selecting, by the controller, a mode among the cleaning mode, the suction mode, or the brushing mode during a period of time.

2. The method for driving the robot based on the properties of the driving surface of claim 1,
wherein generating the property information further comprises
sensing, by the sensing module, a color of the driving surface, and
storing, by the controller, the color of the driving surface with the property information in the storage.

3. The method for driving the robot based on the properties of the driving surface of claim 1, wherein setting the function or generating the moving path further comprises:
searching, by the controller, the function corresponding to the property information, in the storage; and
controlling, by the controller, the functional portion to control performance of the searched function with respect to the driving surface when the battery of the robot is consumed at a reference level or more by performing the searched function.

4. The method for driving the robot based on the properties of the driving surface of claim 1, wherein setting the function and generating the moving path further comprises:
searching, by the controller, for the function corresponding to the property information, in the storage; and
generating, by the controller, the moving path so that the robot moves through all areas of the driving surface having an identical value of property information when the battery of the robot is consumed at a reference level or more by performing the searched function.

5. The method for driving the robot based on the properties of the driving surface of claim 1, the method further comprising:
determining, by the controller, a wheel slip of the driving unit; and
adjusting, by the controller, the position of the robot based on the position of the driving surface stored in the storage when property information related to the driving surface of a current position of the robot comprises the wheel slip.

6. The method for driving the robot based on the properties of the driving surface of claim 1, wherein setting the function and generating the moving path further comprises:
searching, by the controller, the function corresponding to the property information, in the storage; and
setting, by the controller, moving path having a shortest distance in which the robot passes through areas of the driving surface having an identical value of property information when the battery of the robot is consumed at a reference level or more by performing the searched function.

7. A robot moving based on properties of a driving surface, comprising:
a storage configured to store a position of a fixed object placed in a space where the robot moves and property information related to the driving surface;
a functional portion including a motor configured to perform a preset function;
a wheel configured to move the robot;
a sensor configured to sense the driving surface to sense property information related to the driving surface; and
a controller configured to set the function performed with respect to the driving surface based on the property information related to the driving surface and generate a moving path by classifying an area of a heavy consumption of battery and an area of a small consumption of battery, and control the wheel and the functional portion of the robot to perform the set function and to move the robot along the moving path,
wherein the controller is configured to identify the position of the robot based on information related to an area and stored in the storage,
wherein the property information comprises material information and color information related to the driving surface, and
wherein the controller operates the functional portion at an outer boundary of the driving surface when a material of the driving surface reduces a moving speed of the wheel.

8. The robot moving based on the properties of the driving surface of claim 7,
wherein the sensor further comprises a vision sensor that senses color of the driving surface, and
the controller stores the color of the driving surface corresponding to the property information in the storage.

9. The robot moving based on the properties of the driving surface of claim 7, wherein the controller searches for the function corresponding to the property information in the storage and control the functional portion to adjust performing the searched function with respect to the driving surface when the battery of the robot is consumed with a predetermined level or more by performing the searched function.

10. The robot moving based on the properties of the driving surface of claim 7, wherein the controller searches for the function corresponding to the property information in the storage and generates the moving path that the robot completes the moving in all areas of the driving surface having an identical value of property information, when the battery of the robot is consumed with a predetermined level or more by performing the searched function.

11. The robot moving based on the properties of the driving surface of claim 7, wherein the controller determines a wheel slip of the wheel, and the controller adjusts the position of the robot based on the position of the driving surface stored in the storage when property information related to the driving surface of a current position of the robot comprises the wheel slip.

12. The robot moving based on the properties of the driving surface of claim 7, wherein the controller searches for the function corresponding to the property information in the storage and configures moving path having a shortest distance in which the robot passes through areas of the driving surface having an identical value of property information when the battery of the robot is consumed at a reference level or more by performing the searched function.

13. A method for driving a robot based on properties of a driving surface, the method comprising:

sensing, by a sensing module of the robot, the driving surface and generating property information related to the driving surface;

identifying, by a controller of the robot, position of the robot based on information related to an area stored in a storage of the robot;

storing, by the controller of the robot, the position and the property information related to the driving surface in the storage of the robot;

setting, by the controller, a function performed on the driving surface based on the property information related to the driving surface and generating a moving path by classifying an area of a heavy consumption of battery and an area of small consumption of battery; and controlling, by the controller, a driving unit and a functional portion of the robot, to perform the set function and to move the robot along the moving path, wherein the property information comprises material information and color information related to the driving surface, and wherein the controller controls the functional portion to operate at an outer boundary of the driving surface when a material of the driving surface reduces a moving speed of the robot.

* * * * *